(12) United States Patent
Menor (10) Patent No.: US 8,943,668 B2
(45) Date of Patent: Feb. 3, 2015

(54) HEX SWAGED FLUID COUPLING AND METHOD OF MAKING SAME

(71) Applicant: Caterpillar Inc., Peoria, IL (US)

(72) Inventor: Eric Menor, Marinette, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/691,952

(22) Filed: Dec. 3, 2012

(65) Prior Publication Data

US 2013/0097844 A1 Apr. 25, 2013

Related U.S. Application Data

(62) Division of application No. 11/703,280, filed on Feb. 7, 2007, now abandoned.

(51) Int. Cl.
*B21D 39/00* (2006.01)
*B23P 11/00* (2006.01)
*F16L 13/14* (2006.01)
*F16L 33/207* (2006.01)

(52) U.S. Cl.
CPC .............. *B23P 11/00* (2013.01); *F16L 13/141* (2013.01); *F16L 33/2073* (2013.01)
USPC ............................................. 29/508; 285/256

(58) Field of Classification Search
USPC .............. 29/890.114, 890.15, 516, 517, 508; 285/382, 238–259; 72/370.13, 370.26
See application file for complete search history.

(56) References Cited

U.S. PATENT DOCUMENTS

| 1,808,101 | A | 6/1931 | Eastman |
| 2,329,281 | A | 9/1943 | Wallace et al. |
| 2,374,226 | A | 4/1945 | Arthur |
| 2,463,293 | A | 3/1949 | Mentel |
| 2,476,480 | A | 7/1949 | Burckle et al. |
| 2,479,499 | A | 8/1949 | Le Clair |
| 2,525,616 | A | 10/1950 | Peeps |
| 2,540,113 | A | 2/1951 | Hartley |
| 2,733,941 | A | 2/1956 | Trevaskis |
| 2,920,910 | A | 1/1960 | Ernst |
| 3,539,207 | A | 2/1969 | Harris |
| 3,512,810 | A | 5/1970 | Harris |
| 3,590,455 | A | 7/1971 | Harris |

(Continued)

FOREIGN PATENT DOCUMENTS

WO 9418487 8/1994
WO WO 9418487 A1 * 8/1994

OTHER PUBLICATIONS

Website: http://www.assemblymag.com/articles/print/87755; Title Assembly Presses: Crimping, Staking, Swaging, Clinching.

*Primary Examiner* — Jacob Cigna
(74) *Attorney, Agent, or Firm* — Baker Hostetler (57) ABSTRACT

A fluid coupling including a cylindrical stem having a fluid conduit therethrough and a hollow shell provided over a first end of the stem. A tool engaging hexagonal shape on an outer surface of the shell is disposed radially outward from a swage joined portion of the shell to the stem. The tool engaging hexagonal shape includes six non-contiguous flats having rounded portions therebetween. The swage joined portion and the tool engaging hexagonal shape are located at the same axial location along a centerline of the hollow shell, and the swage joined portion has an axial length along the centerline corresponding to an axial length along the centerline corresponding to an axial length along the centerline of the tool engaging hexagonal shape.

19 Claims, 4 Drawing Sheets

(56) References Cited

U.S. PATENT DOCUMENTS

| | | | |
|---|---|---|---|
| 3,758,189 A * | 9/1973 | Codrino | 385/81 |
| 4,050,286 A | 9/1977 | Gasier et al. | |
| 4,111,469 A | 9/1978 | Kavick | |
| 4,458,926 A | 7/1984 | Williamson | |
| 4,804,212 A | 2/1989 | Vyse | |
| 4,902,043 A | 2/1990 | Zillig et al. | |
| 5,031,301 A | 7/1991 | Oetiker | |
| 5,090,854 A | 2/1992 | Hafeli et al. | |
| 5,206,991 A | 5/1993 | Barley | |
| 5,419,028 A | 5/1995 | Manning et al. | |
| 5,533,764 A | 7/1996 | Williamson | |
| 5,775,740 A | 7/1998 | Fukaya et al. | |
| 6,318,763 B1 | 11/2001 | Huang | |
| 6,447,017 B1 | 9/2002 | Gilbreath et al. | |
| 6,604,760 B2 | 8/2003 | Cresswell et al. | |
| 6,718,814 B2 | 4/2004 | Bartrom et al. | |
| 6,764,106 B1 | 7/2004 | Smith et al. | |
| 6,832,785 B1 | 12/2004 | Zitkovic, Jr. | |
| D577,795 S | 9/2008 | Smith et al. | |
| 7,886,569 B2 * | 2/2011 | Weber et al. | 72/402 |
| 8,516,871 B2 * | 8/2013 | Weber et al. | 72/402 |
| 2004/0145182 A1 * | 7/2004 | Smith et al. | 285/256 |
| 2006/0220379 A1 | 10/2006 | Arima | |
| 2010/0123310 A1 * | 5/2010 | Miller et al. | 285/256 |
| 2010/0140926 A1 * | 6/2010 | Swift et al. | 285/256 |

\* cited by examiner

HEX SWAGED FLUID COUPLING AND METHOD OF MAKING SAME

RELATION TO OTHER PATENT APPLICATION

This application is a divisional of co-pending application Ser. No. 11/703,280, filed Feb. 7, 2007.

TECHNICAL FIELD

The present disclosure relates generally to a method of making a fluid coupling, and more particularly to die forming a hexagon shape on an outer portion of a shell while joining the shell to a stem.

BACKGROUND

Fluid couplings are used to connect a fluid line or hose to various types of industrial equipment and machinery via the equipment connection ports or manifolds. A fluid coupling typically has two ends: one end generally defines the hose connection end and the other end generally defines the equipment connection end. In one type of fluid coupling, a stem is provided having a first end, the equipment connection end, and a second end, the hose connection end, wherein the second end includes a shell placed over the stem. The first end of the stem may be threaded or may include a nut placed thereon for engaging the equipment. The external surface of the second end of the stem typically engages the internal surface of a hose, while the internal surface of the shell engages the external surface of the hose.

During the manufacture of such fluid couplings, a wrenching surface, such as a hexagonal surface, is generally provided on the outer portion of the shell. A wrench, or other suitable tool, may be used to engage the wrenching surface while securing the equipment connection end of the fluid coupling to the equipment. This maintains stability of the hose connection end and prevents damage to the hose and/or its connection to the coupling by a resulting tendency to twist during the securing procedure. The hexagonal surface is generally provided at a different horizontal location of the fluid coupling than the horizontal location of a joined portion of the stem and the shell. Common methods of joining the coupling pieces include crimping, staking, swaging, etc.

U.S. Pat. No. 5,419,028 teaches a method of making a hose coupling. Specifically, a method of forming a ferrule of the hose coupling is taught. The ferrule is then joined to an insert of the hose coupling using well-known methods. These methods include inwardly deforming or crimping the ferrule toward the insert at a horizontal location of the hose coupling different than the horizontal location of an enlarged hex-shaped nut portion. Inherently, separate steps are required to form the hex-shaped nut portion and the joined portion. In addition, because each of the hex portion and the joined portion occupies a separate horizontal space, the ferrule of this method may require additional raw material to construct the coupling. It is therefore desirable to provide a more efficient method of making a hose coupling.

The present disclosure is directed to one or more of the problems set forth above.

SUMMARY OF THE INVENTION

In one aspect, a method of making a fluid coupling includes a step of providing a cylindrical stem having a fluid conduit therethrough. A hollow shell is placed over a first end of the stem. The shell is die swaged to the stem at an attachment location along a length of the stem. The die swaging step includes forming a tool engaging hexagonal shape on an outer surface of the shell at the attachment location.

In another aspect, a fluid coupling includes a cylindrical stem having a fluid conduit therethrough, and a hollow shell provided over a first end of the stem. The fluid coupling also includes a tool engaging hexagonal shape on an outer surface of the shell at an attachment location of the shell to the stem.

DETAILED DESCRIPTION

Figure 1:
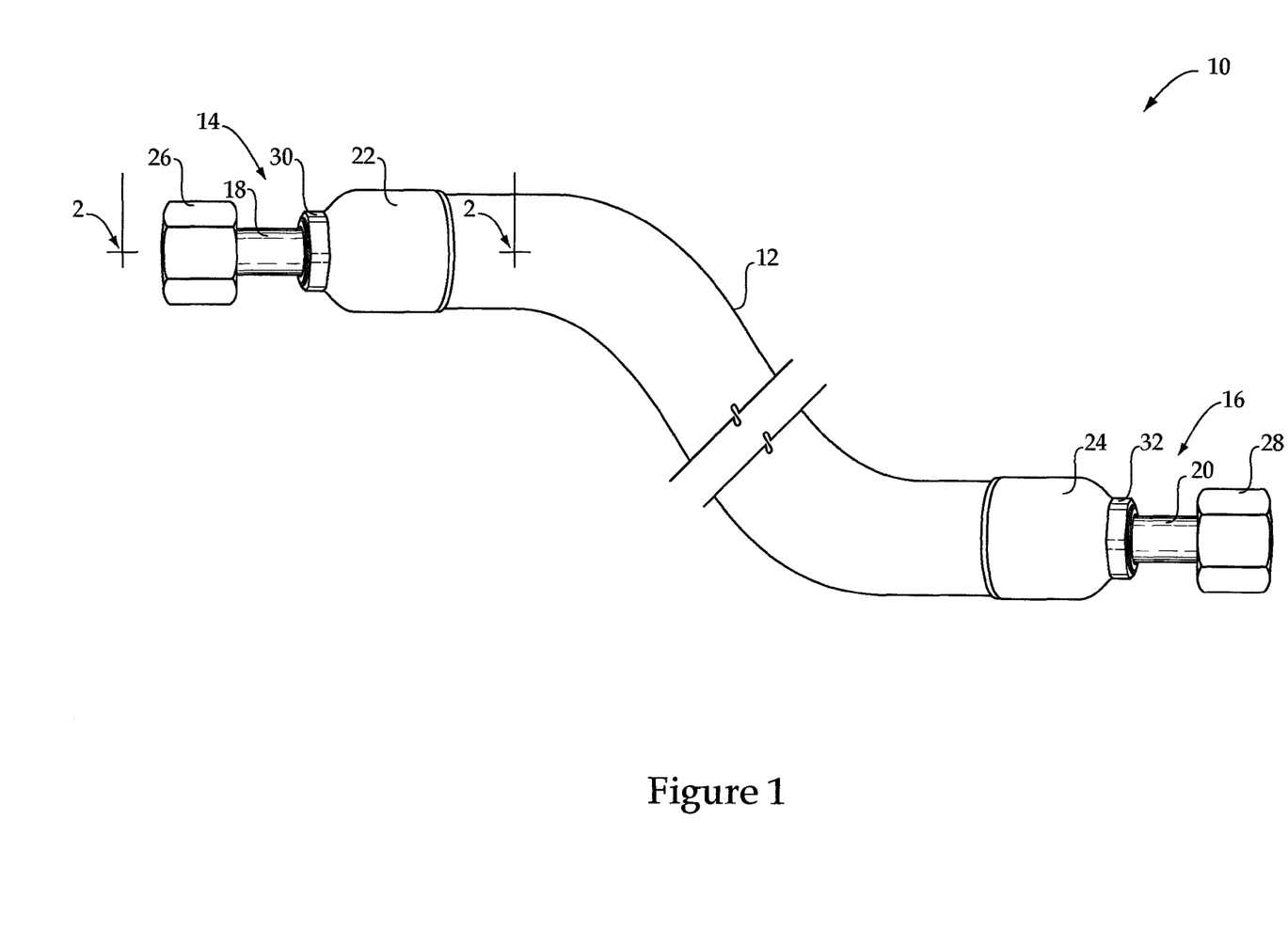
FIG. 1 is a side diagrammatic view of a fluid hose having a fluid coupling secured to each end.

Referring to FIG. 1, a hose assembly 10 includes a fluid hose 12 and fluid couplings 14 and 16. Generally, each of the fluid couplings 14 and 16 includes stems 18 and 20, respectively, and shells 22 and 24, respectively. Each of the shells 22 and 24 is configured to engage the fluid hose 12. A nut may be provided at the end of the coupling opposite the shell for engaging an equipment connection. For example, fluid coupling 14 includes a nut 26 and fluid coupling 16 includes a nut 28. A tool engaging hexagonal surface, such as surfaces 30 and 32, may be provided on the fluid couplings 14 and 16 for engagement by a tool, such as, for example, a wrench.

Figure 2:
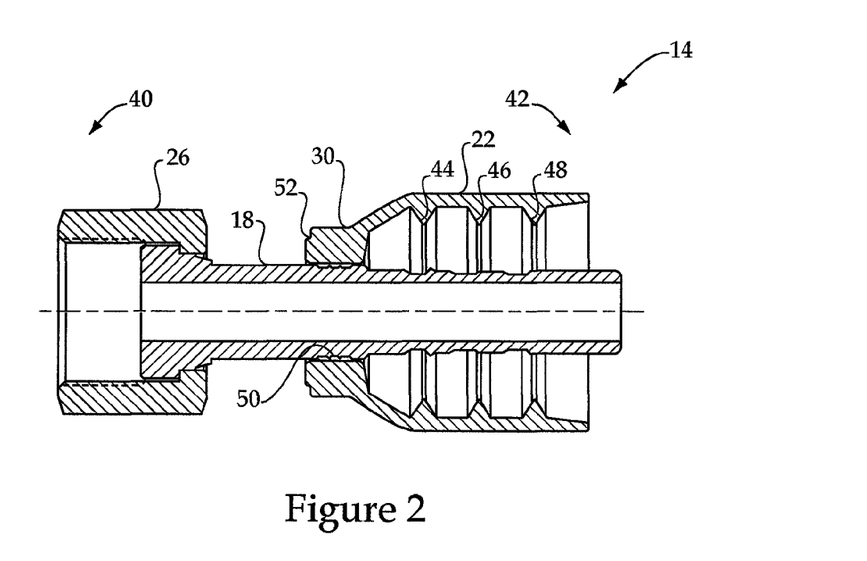
FIG. 2 is a cross-sectional view along line 2-2 of FIG. 1.

FIG. 2 shows a cross-sectional view along lines 2-2 of the fluid coupling 14 of FIG. 1. Fluid coupling 14 may be, for example, a hydraulic coupling, and may be made of any suitable material, such as, for example, a metallic bar stock material. The stem 18 of the fluid coupling 14 has an equipment connection end, shown generally at 40, and a hose connection end, shown generally at 42. The equipment connection end 40 is configured to connect fluid coupling 14 to various types of industrial equipment and machinery via the connection ports or manifolds of the equipment. The nut 26 may be provided on the stem 18 for engaging equipment (not shown). Alternatively, the stem 18 may be threaded at the equipment connection end 40 for engaging the port or manifold of the equipment.

The shell 22 is positioned around the stem 18 at the hose connection end 42. A hose, such as, for example, the hose 12 of FIG. 1, may be secured to the fluid coupling 14 by positioning the hose between the stem 18 and the shell 22. An inner surface of the shell 22 may be provided with at least one annular projection, such as, for example, projections 44, 46, and 48, for providing a secure engagement with the hose. In addition, an external surface of the stem 18 at the hose connection end 42 may include annular indentations and/or projections to assist with hose engagement.

A wrenching surface, such as the tool engaging hexagonal surface 30, is generally provided on the outer portion of the shell 22. A wrench, or other suitable tool, may be used to engage the tool engaging hexagonal surface 30 while securing the equipment connection end 40 of the fluid coupling 14 to some equipment. This maintains stability of the hose connection end 42 and prevents twisting damage to the hose and/or its connection to the coupling 14 by a resulting rotation. The tool engaging hexagonal surface 30 is provided at the same horizontal location of the fluid coupling 14 as the horizontal location of a joined portion 50 of the stem 18 and the shell 22. A step area 52 may also be provided on the external surface of the shell 22 to prevent the nut 26 from interfering with the formation of the tool engaging hexagonal surface 30 during a die swaging process, or any other suitable process.

Figure 3:
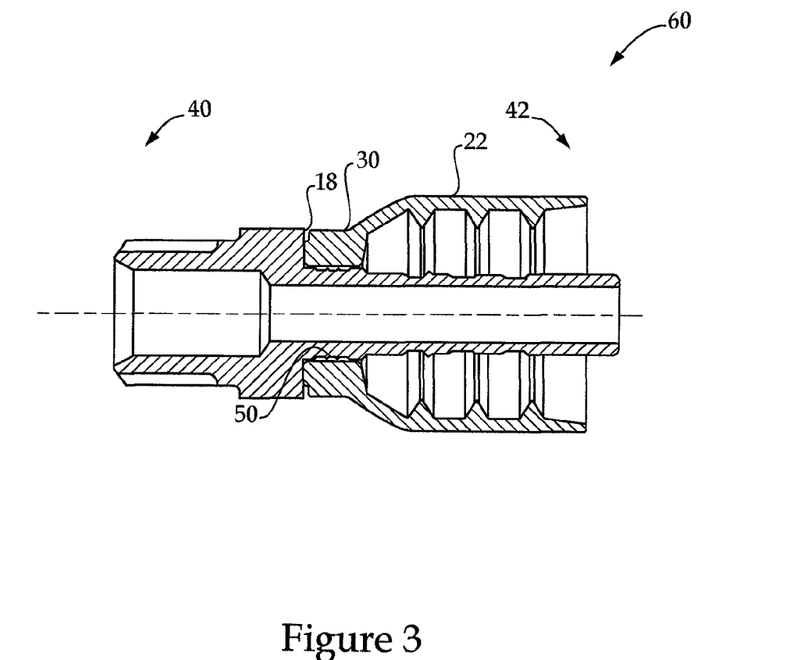
FIG. 3 is a cross-sectional view of another embodiment of a fluid coupling according to the present disclosure.
Figure 4:
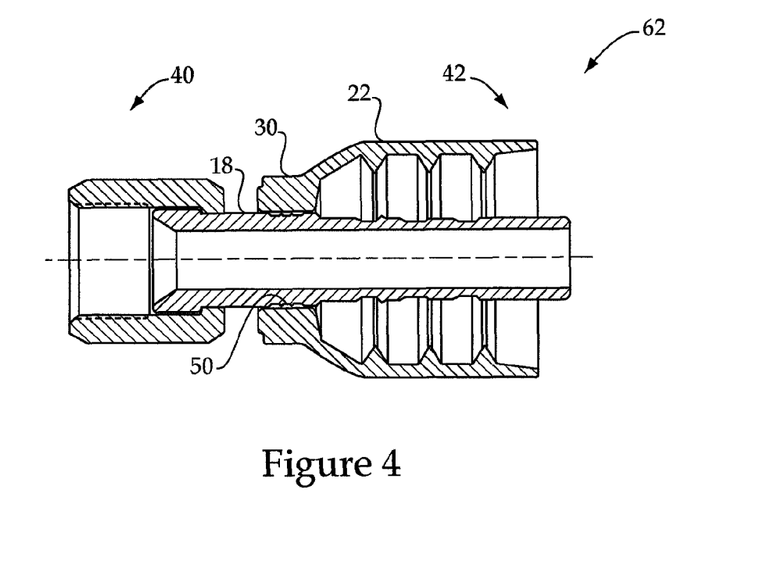
FIG. 4 is a cross-sectional view of yet another embodiment of a fluid coupling according to the present disclosure.
Figure 5:
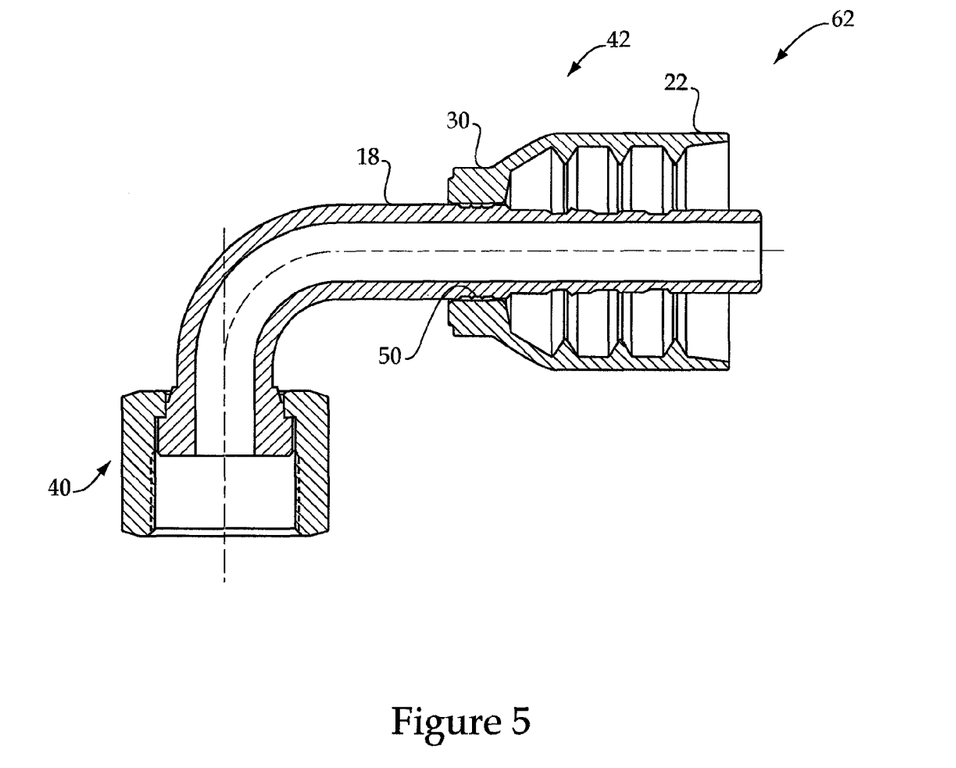
FIG. 5 is a cross-sectional view of yet another embodiment of a fluid coupling according to the present disclosure.

The fluid coupling of the present disclosure may be of any conventional configuration well known to the art, including, but not limited to, a male pipe coupling 60, as shown in FIG. 3, a JIC 37 Degree Flare coupling 62, as shown, for example, in FIG. 4, or an angled connection coupling 64, as shown in FIG. 5. In these figures, it should be readily apparent that, for the sake of clarity, only those parts which are relevant to a discussion of the tool engaging hexagonal surface 30 and the joined portion 50 are numbered.

Figure 6:
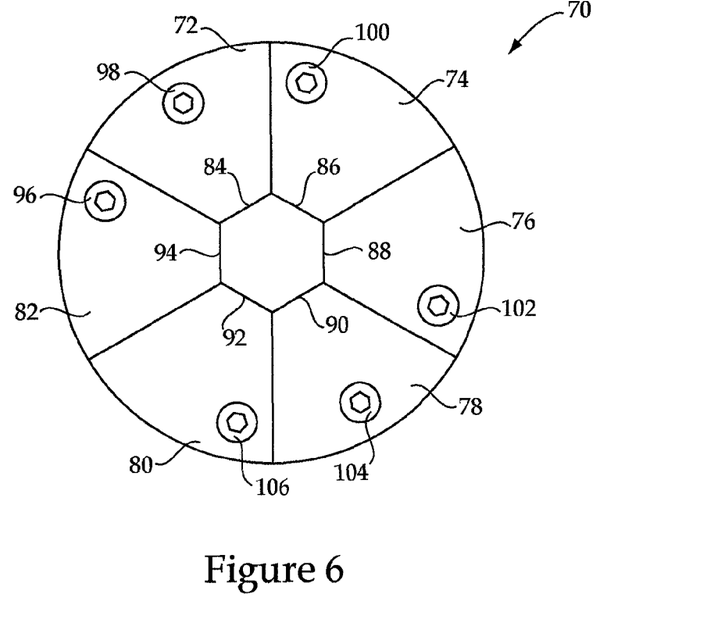
FIG. 6 is a top diagrammatic view of a die set for making a fluid coupling according to the present disclosure.

FIG. 6 shows a die set 70 that may be used to join the shell 22 to the stem 18 of the fluid coupling 14. The die set 70, shown in a closed position, includes six die segments 72-82. Each die segment 72-82 includes a generally planar internal surface, shown at 84-94, respectively. A well-known machine, as will be appreciated by those skilled in the art, engages segments 72-82 using bolts 96-106. The die set 70 is configured to close radially inward around the shell 22 and stem 18 to form tool engaging hexagonal surface 30 and also mechanically join the shell to the stem through deformation of the shell. The tool engaging hexagonal surface 30, therefore, is located at the same horizontal position along the fluid coupling 14 as the position at which the shell 22 and stem 18 are joined, namely, joined portion 50. The end result being that the tool engaging hexagonal surface 30 is located at the same axial location as, but radially outward from, the joined portion 50, as shown in FIGS. 2-5. Also as shown in FIGS. 2-5, joined portioned 50 has an axial length corresponding to an axial length of the tool engaging hexagonal surface 30. Such axial lengths are relative to a centerline of the hollow shell 22. Although six die segments are shown, one skilled in the art will appreciate that two or more die segments may be used, as long as the inner surfaces of the die segments form a hexagonal shape when in a closed position.

INDUSTRIAL APPLICABILITY

According to FIGS. 1-7, a fluid coupling, such as, for example, fluid coupling 14, generally comprises a stem 18 having an equipment connection end, shown generally at 40, and a hose connection end, shown generally at 42. The equipment connection end 40 may include a nut 26 thereon for engaging equipment, and the hose connection end 42 may include a shell 22 positioned around the stem 18. A hose may be secured to the fluid coupling 14 by positioning the hose between the stem 18 and the shell 22. A wrenching surface, such as a tool engaging hexagonal surface 30, is generally provided on the outer portion of the shell 22. A wrench, or other suitable tool, may be used to engage the tool engaging hexagonal surface 30 while securing the equipment connection end 40 of the fluid coupling 14 to the equipment to avoid twisting. This maintains stability of the hose connection end 42 and prevents damage to the hose by a resulting rotation of the shell 22.

During manufacture, the shell 22 is typically joined to the stem 18 using well-known methods such as crimping, staking, swaging, etc. The joined portion or area is typically at a horizontal location of the hydraulic coupling 14 different than that of the tool engaging hexagonal surface 30 because separate steps are undertaken to form the hexagonal surface and join the shell 22 to the stem 18.

The method of making a fluid coupling according to the present disclosure is advantageous because it provides a more cost efficient method of making the coupling. Both the stem 18 and the shell 22 are machined to a predetermined size and shape out of a metal, such as, for example, a bar of round metal stock. The shell 22, after machined, includes a first end having an outer diameter greater than an outer diameter of a second end. The second end may also include a step area 52 to assist in the die swaging process. The shell 22 is then die swaged to the stem 18, using the die segments 72-82, at the second end of the shell. The step area 52 prevents the nut 26 from interfering with the formation of the tool engaging hexagonal surface 30 in the event that the nut migrates into contact with the shell 22 during the swaging process. The tool engaging hexagonal surface 30 is provided at the same horizontal location of the fluid coupling 14 as the horizontal location of the joined portion 50, or swage joined portion of the stem 18 and the shell 22. This allows for a shell component that is shorter in length than prior art couplings. A shorter shell permits a shorter stem.

Figure 7:
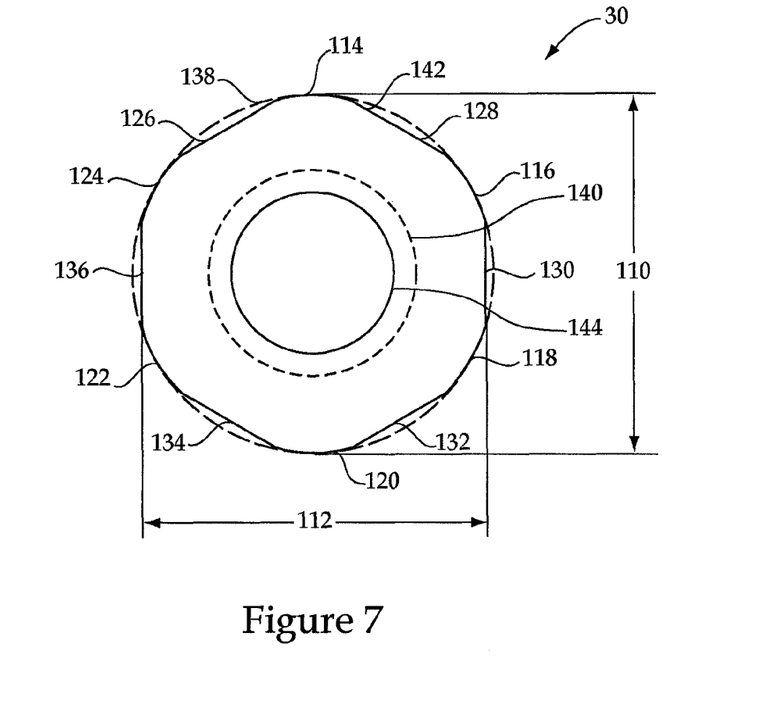
FIG. 7 is a top diagrammatic view of the tool engaging hexagonal surface of a fluid coupling according to the present disclosure.

The inner diameter and outer diameter of the second end of the shell 22 should be sized so that a proper hexagonal shape is formed after the shell and the stem 18 are die swaged using the die segments 72-82. A proper hexagonal shape, for example, the tool engaging hexagonal surface 30 as shown in FIG. 7, may comprise a hexagonal shape where a peak to peak measurement 110 is about 1.1 times a flat to flat measurement 112. Rounded portions 114-124 connect flats 126-136 of the tool engaging hexagonal surface 30 and may reflect undeformed surfaces. It is also important that a secure connection is formed between the stem 18 and the shell 22 at the joined portion 50.

To determine the inner and outer diameters of the shell 22, it may be useful to assume that the area of the shell is about the same before the swaging process ("pre-swaged") and after the swaging process ("post-swaged"). Specifically, it may be assumed that the pre-swaged area is the difference between the area of a pre-swaged outer diameter 138 ($A_{OD}$) and the area of a pre-swaged inner diameter 140 ($A_{ID-1}$). It may also be assumed that the post-swaged area is the difference between the area of a post-swaged hexagonal surface 142 ($A_{HEX}$) and the area of a post-swaged inner diameter 144 ($A_{ID-2}$). The equation is as follows:

$$(A_{OD})-(A_{ID-1})=(A_{HEX})-(A_{ID-2})$$

By using inner diameter calculations from a previous swaging or joining process and a value for a desirable hexagonal surface, an approximate pre-swaged outer diameter can be determined for the shell 22. Those skilled in the art will recognize that this suggestion reflects a starting point. Further tests and iterations about this starting point may be needed to arrive at a suitable result for each specific application. Suitable, in this context, means a good shell to stem connection and an adequate tool engagement surface.

As an example, a previous joining process may utilize a shell having a pre-swaged inner diameter of 0.440 inches and a post-swaged inner diameter of 0.390 inches. These diameters can be used to derive at areas, for example, 0.152 inches$^2$ and 0.119 inches$^2$, respectively. If the area of a desirable post-swaged hexagonal surface is 0.410 inches$^2$, the equation now includes the following values:

$$(A_{OD})-0.152 \text{ inches}^2=0.410 \text{ inches}^2-0.119 \text{ inches}^2$$

We can easily conclude that the pre-swaged diameter is 0.751 in. From there, and using a stem sized for use with a previous joining process, the inner and outer diameters of the shell 22 may be adjusted to attain values providing a proper post-swaged hexagonal surface and a secure connection to the stem 18.

The fluid coupling 14 may be manufactured for use with a fluid hose, such as, for example, fluid hose 12, having an internal surface diameter of about ¼ inch, ⅜ inch, ½ inch, or any other useful diameter. Specifically, the fluid hose may meet Society of Automotive Engineer (SAE) standard J517 and may be compatible with series 100R1, 100R2, 100R3, 100R6, 100R7, 100R12, 100R14, 100R15, 100R16, or 100R17, of that standard. Alternatively, the fluid hose may meet Deutsches Institut fur Normung (DIN) standard 20023. These standards are provided as examples only, and one skilled in the art will appreciate that the present method may be useful in manufacturing a variety of fluid couplings.

The fluid coupling 14 manufactured according to the method of the present disclosure may provide savings of over 10% of manufacturing costs by joining the shell 22 to the stem 18 in the same step that forms the tool engaging hexagonal surface 30. In addition, because each of the tool engaging hexagonal surface 30 and the joined portion 50 occupies the same horizontal space along the coupling 14, the shell 22 and/or stem 18 of this method may be able to have shortened lengths. This would also provide cost savings in that less material is required to produce the fluid coupling 14. Those skilled in the at will recognize that the fluid couplings of FIGS. 2, 4 and 5, which include a nut 26, inherently result in the nut 26 being trapped to move along an axis of the stem 18 between contact with the step 52 area of the shell 2 and contact with an unnumbered shoulder of the stem 18.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of making a fluid coupling, comprising the steps of:
    positioning a hollow shell around a cylindrical stem;
    die swaging the hollow shell to the cylindrical stem to mechanically connect the hollow shell to the cylindrical stem over a joined portion that has an axial length from where a swaging deformed inner surface of the hollow shell and cylindrical stem first contact each other to where the deformed inner surface of the hollow shell and cylindrical stem no longer contact each other; and
    the die swaging step includes deforming an outer surface of the hollow shell into a wrenching surface that includes a plurality of flats, and axially securing the hollow shell to the cylindrical stem by deforming the hollow shell to reduce the inner diameter of the hollow shell along the entire axial length from a pre-swagged inner diameter smooth along the entire axial length to a post-swaged inner diameter.

2. The method of claim 1 including positioning a nut on the stem prior to the die swaging step; and
    preventing the nut from interfering with the die swaging step with a step area on one end of the shell if the nut migrates into contact with the shell during the die swaging step.

3. The method of claim 2 wherein the nut is trapped to move along an axis of the stem between contact with the step area of the shell and contact with the shoulder of the stem.

4. The method of claim 1 wherein the die swaging step is accomplished with a die set consisting of six die segments.

5. The method of claim 4 wherein each of the die segments has a planar internal surface.

6. The method of claim 5 wherein the die swaging step includes closing the planar internal surfaces of the die segments radially inward around a centerline of the hollow shell.

7. The method of claim 6 wherein the plurality of flats are separated by undeformed surfaces; and
    wherein a cross sectional area of the shell along the entire axial length has a pre-swaged area that is defined by a difference between a pre-swaged outer diameter and a pre-swaged inner diameter;
    wherein a cross sectional area of the shell along the entire axial length has a post-swaged area that is a post-swaged hexagonal cross sectional area minus an area defined by the post-swaged inner diameter;
    the pre-swaged area is the same as the post-swaged area along the entire axial length.

8. A method of making a hose assembly, comprising the steps of:
    making a plurality of fluid couplings, each by:
        positioning a hollow shell around a cylindrical stem;
        die swaging the hollow shell to the cylindrical stem to mechanically connect and axially secure the hollow shell to the cylindrical stem, the die swaging including deforming an inner cylindrical surface of the hollow shell wherein prior to the deforming, the inner cylindrical surface is smooth along an entire axial length that is to be deformed; and
        the die swaging step includes deforming an outer surface of the hollow shell into a wrenching surface that includes a plurality of flats;
        preventing interference involvement by a nut on the cylindrical stem with the die swaging step by including a step area on one end of the hollow shell;
    securing a first fluid coupling to one end of a hose; and
    securing a second fluid coupling to a second end of the hose.

9. The method of claim 8 wherein the die swaging step is accomplished with a die set consisting of six die segments.

10. The method of claim 9 wherein each of the die segments has a planar internal surface.

11. The method of claim 10 wherein the die swaging step includes closing the planar internal surfaces of the die segments radially inward around a centerline of the hollow shell.

12. The method of claim 11 wherein the plurality of flats are separated by undeformed surfaces.

13. A method of making a fluid coupling, comprising:
    providing a cylindrical stem having a fluid conduit therethrough;
    placing a hollow shell over a first end of the stem;
    die swaging the shell to the stem at a swage joined portion extending along an entire length of the stem that will be contacted by a swaging deformed inner surface of the shell, wherein the die swaging step includes forming a tool engaging hexagonal shape on an outer surface of the shell at a same axial location along a centerline of the hollow shell, but radially outward from, the swage joined portion, wherein the tool engaging hexagonal shape includes six non-contiguous flats having rounded portions therebetween;
    the die swaging step includes axially securing the hollow shell to the cylindrical stem by reducing the inner diameter of the hollow shell along the entire axial length from a pre-swaged inner diameter smooth along the entire axial length to a post-swaged inner diameter;

preventing interference involvement by a nut on the cylindrical system with the die swaging step by including a step area on one end of the hollow shell; and wherein the swage joined portion has an axial length along the centerline corresponding to an axial length along the centerline of the tool engaging hexagonal shape.

14. The method of claim 13, further including:
providing a fluid hose having a first end for receiving the first end of the stem, wherein the hollow shell is configured to receive the first end of the hose.

15. The method of claim 13, wherein the placing step further includes machining the shell from a bar of round stock, wherein a first end of the shell has an outer diameter less than an outer diameter of a second end of the shell.

16. The method of claim 13, wherein the providing step further includes providing a nut on a second end of the stem for engaging an equipment connection.

17. The method of claim 16, including a step of preventing the nut from interfering with the die swaging step with a step area on one end of the shell.

18. The method of claim 13, wherein the die swaging step further includes at least two die pieces engaging the outer surface of the shell.

19. The method of claim 18, wherein the die swaging step further includes at least six die pieces engaging the outer surface of the shell.

* * * * *

UNITED STATES PATENT AND TRADEMARK OFFICE
CERTIFICATE OF CORRECTION

| | | |
|---|---|---|
| PATENT NO. | : 8,943,668 B2 | Page 1 of 1 |
| APPLICATION NO. | : 13/691952 | |
| DATED | : February 3, 2015 | |
| INVENTOR(S) | : Eric Menor | |

It is certified that error appears in the above-identified patent and that said Letters Patent is hereby corrected as shown below:

In the specification

Column 1, line 6, delete "This application is a divisional of co-pending application Ser. No. 11/703,280, filed Feb. 7, 2007." and insert -- This application is a divisional of application Ser. No. 11/703,280, filed Feb. 7, 2007, now abandoned. --.

Signed and Sealed this
Seventeenth Day of November, 2015

Michelle K. Lee
*Director of the United States Patent and Trademark Office*